US008306969B2

(12) United States Patent
Beaudreau (10) Patent No.: US 8,306,969 B2
(45) Date of Patent: Nov. 6, 2012

(54) LINKING SEARCH QUERIES TO RICH MEDIA THEMES

(75) Inventor: Scott Beaudreau, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 710 days.

(21) Appl. No.: 12/236,489

(22) Filed: Sep. 23, 2008

(65) Prior Publication Data

US 2010/0082661 A1    Apr. 1, 2010

(51) Int. Cl.
    *G06F 17/00*  (2006.01)
(52) U.S. Cl. .................. 707/722; 707/770; 715/273
(58) Field of Classification Search .......... 707/708, 707/713, 759, 769, 706, 722, 770; 715/273
    See application file for complete search history.

(56) References Cited

U.S. PATENT DOCUMENTS

| 6,038,560 | A | 3/2000 | Wical |
| 6,094,652 | A | 7/2000 | Faisal |
| 6,208,988 | B1 | 3/2001 | Schultz |
| 7,096,214 | B1 | 8/2006 | Bharat |
| 2003/0182208 | A1* | 9/2003 | Dupuis et al. ............. 705/27 |
| 2004/0024753 | A1* | 2/2004 | Chane et al. .............. 707/3 |
| 2005/0080764 | A1* | 4/2005 | Ito .......................... 707/1 |
| 2006/0053109 | A1 | 3/2006 | Sudanagunta |
| 2006/0174209 | A1* | 8/2006 | Barros .................... 715/764 |
| 2006/0265344 | A1 | 11/2006 | Woods |
| 2006/0294068 | A1 | 12/2006 | Li |
| 2007/0222747 | A1* | 9/2007 | Kritt et al. ............... 345/156 |
| 2008/0097970 | A1* | 4/2008 | Olstad et al. ............. 707/3 |
| 2008/0155060 | A1* | 6/2008 | Weber et al. ............ 709/218 |
| 2008/0181574 | A1* | 7/2008 | Ellis et al. ............... 386/83 |
| 2008/0280902 | A1* | 11/2008 | Fraley et al. ........... 514/235.5 |

OTHER PUBLICATIONS

Search: http://www.deitel.com/Web2eBook/Search/tabid/2484/Default.aspx, Date: Jul. 30, 2008.
A Theme-Based Search Technique—http://ieeexplore.ieee.org/ie15/4285175/4285176/04285288.pdf?temp=x&htry=1, Date: 2007.

* cited by examiner

*Primary Examiner* — Greta Robinson
*Assistant Examiner* — Md. I Uddin
(74) *Attorney, Agent, or Firm* — Shook Hardy & Bacon L.L.P.

(57) ABSTRACT

Methods, systems and computer-readable media for providing a rich media themed search results webpage are provided. A search query entered by a user into an internet search engine is analyzed based on one or both of the search query terms and user data communicated to a theme configuration module to determine an appropriate rich media theme. A rich media theme is then selected and combined with a search results display, returned by the search engine, to compose a search results webpage. The rich media theme content is displayed in an ambient manner such that the search results display remains visible to the user. The rich media theme content provides, among other things, relevant images, videos, audio, advertisements, and interactive features that enhance the value of the search results webpage.

20 Claims, 8 Drawing Sheets

LINKING SEARCH QUERIES TO RICH MEDIA THEMES

BACKGROUND

In the ever expanding world of the Internet, search engines have become a near necessity for users to find the websites and information they seek. As a result, countless search engines and methods for searching have been developed and deployed to users. These search engines utilize many different techniques of organizing and arranging search results in an attempt to provide users with relevant information in a highly useable way. Such techniques vary widely in methodology, but in general most analyze the search query terms entered by a user to find keywords or phrases that identify or relate to specific websites and content. More broad or generalized relationships are also found to increase the number of possibly relevant search results.

The search results, which typically include websites and links to content, are then displayed to a user in a multitude of ways including ranking by the directness of the relationship to the search query terms, ranking by popularity, or where advertisements are involved ranking by which ads are the most profitable, among others.

BRIEF SUMMARY

The present invention relates generally to computer related methods, systems and computer-readable media for displaying a rich media themed search results webpage. A search engine is employed to provide an internet search function. A user's entered search query is analyzed for content and context to determine the topic, or subject, of the search query. From the analysis a rich media theme is selected that correlates with the search query and is representative of the search query content, context, or both. The rich media theme, which may comprise a plurality of elements including images, video, audio, and interactive components, among others, is combined with a search results display provided by the search engine to produce a rich media themed search results webpage. The rich media theme is displayed in an ambient manner and does not obstruct a user's view of the search results display.

This Summary is provided to introduce a selection of concepts that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWING

The present invention is described in detail below with reference to the attached drawing figures, wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide methods, systems, and computer-readable media for providing on a display a rich media themed search results webpage. In one aspect, a method for providing on a display a rich media themed search results webpage is provided. A search query is received at a search engine and one or more search results is obtained from the search engine. The one or more search terms received at the search engine or user context data, are analyzed. One or more theme databases are accessed and the rich media themes stored therein are compared to the search query analysis. A rich media theme that correlates to the search query analysis is selected and the rich media theme and search results are displayed on a rich media themed search results webpage. In another aspect of the present invention, a computerized system for providing on a display a rich media themed search results webpage is provided. The computerized system includes a search engine configured to provide a search query module for receiving a search query from a user and returning a search results display, and a theme configuration module for analyzing search query, returning a rich media theme that correlates with the search query, and composing a search results webpage from the search results display and the rich media theme. The system further includes a computing device configured to display the search results webpage.

In yet another aspect of the present invention, one or more computer readable media having computer-executable instructions embodied thereon, that when executed perform a method for providing on a display a rich media themed search results webpage is provided. By the method a search query is received at a search engine, one or more search results is obtained from the search engine and a search results display is generated. One or more terms or user data of the search query are analyzed and one or more theme databases are accessed. The search query analysis is compared to the one or more rich media themes stored in the theme databases and a rich media theme is selected. A plurality of layers in which one or more components of the search results display are displayed in a top layer, and one or more components of the rich media theme are displayed in one or more background layers is provided. A search results webpage is composed by stacking the layers to create a unified display and is then displayed The rich media theme of the search results webpage is representative of the search query terms or user data and is displayed in an ambient manner such that the theme content does not obstruct a user's view of the search results display.

Figure 1:
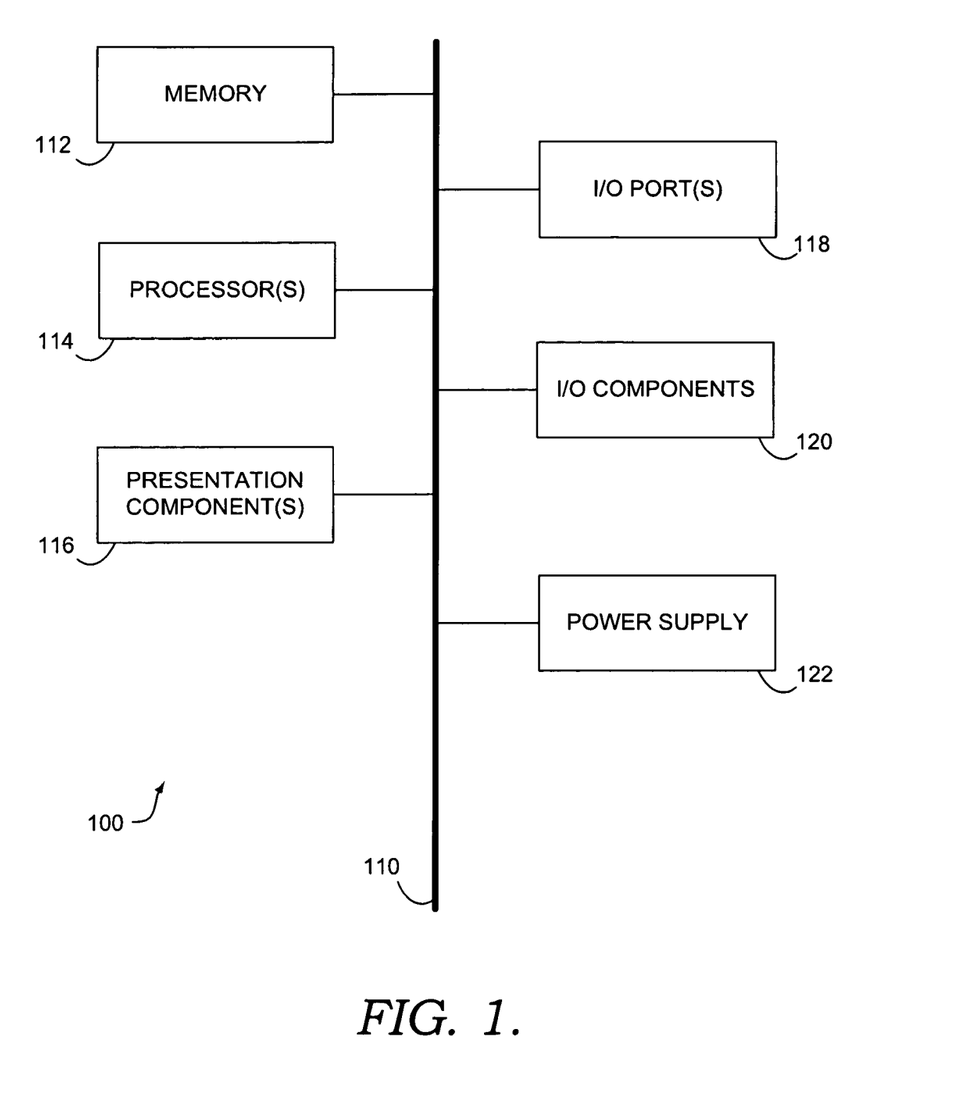
FIG. 1 is a block diagram of an exemplary computing environment suitable for use in implementing embodiments of the present invention.

Referring initially to FIG. 1 in particular, an exemplary operating environment for implementing the present invention is shown and designated generally as computing device 100. The computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, the computing device 100 includes a bus 110 that directly or indirectly couples the following devices: memory 112, one or more processors 114, one or more presentation components 116, input/output ports 118, input/output components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would be more accurately be grey and fuzzy. For example, one may consider a presentation component such as a display device to be an I/O component. Also, processors have memory. It is recognized that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

The memory 112 includes computer-storage media in the form of volatile and/or nonvolatile memory. The memory 112 may be removable, nonremovable, or a combination thereof. Exemplary hardware devices include solid-state memory, hard drives, optical-disc drives, etc. The computing device 100 includes one or more processors that read data from various entities such as the memory 112 or I/O components 120. Presentation component(s) 116 present data indications to a user or other device. Exemplary presentation components 116 include a display device, speaker, printing component, vibrating component, etc.

I/O ports 118 allow the computing device 100 to be logically coupled to other devices including I/O components 120, some of which may be built in. Illustrative components include a microphone, joystick, game pad, satellite dish, scanner, printer, wireless device, etc.

Figure 2:
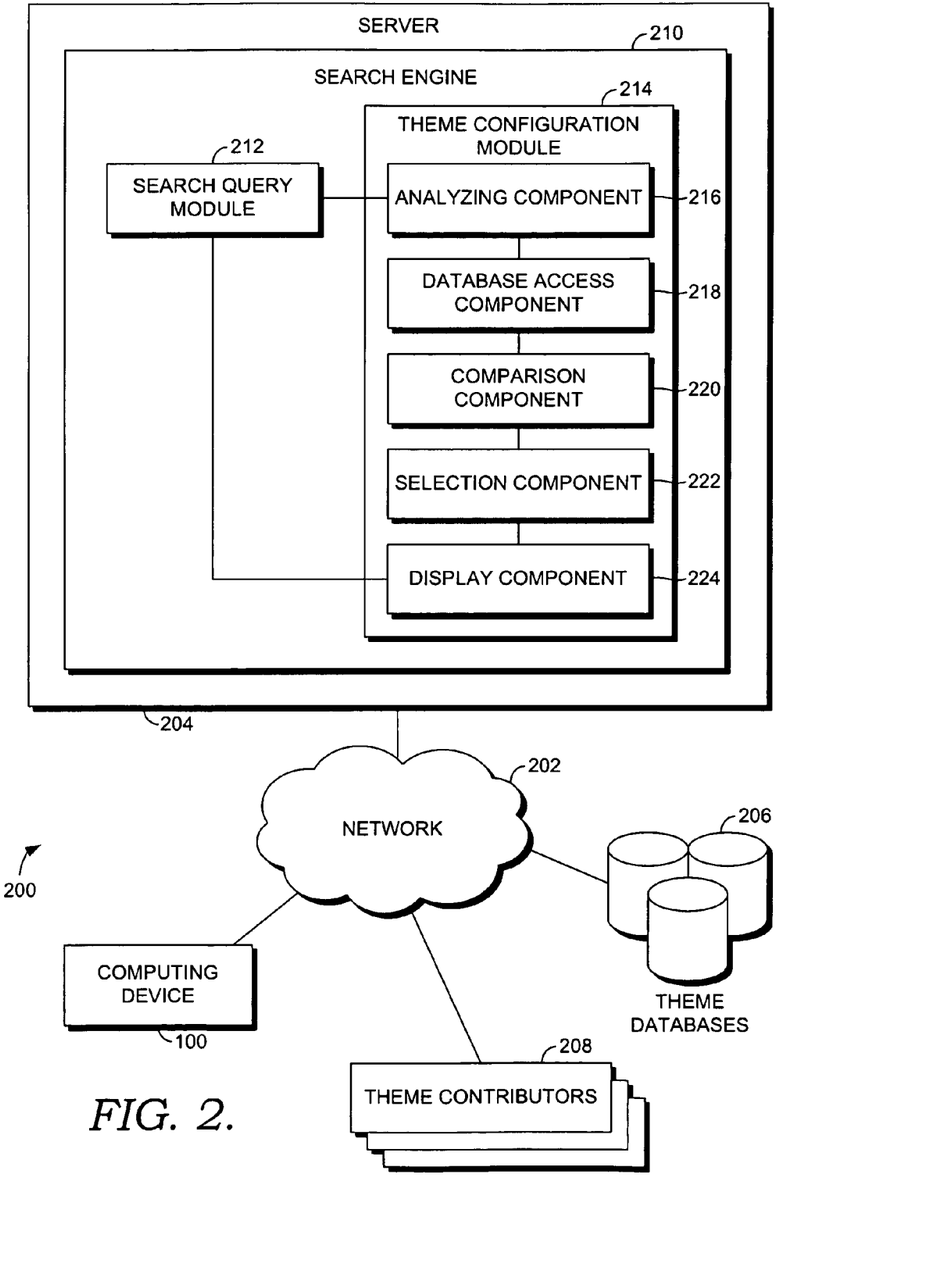
FIG. 2 is a block diagram of an exemplary computing system architecture suitable for use in implementing embodiments of the present invention.

Referring now to FIG. 2, an exemplary computing system architecture 200 suitable for use in implementing embodiments of the present invention is depicted. A computing device 100 is connected to a network 202. The network 202 further connects and provides communication to a server 204, theme databases 206 and theme contributors 208.

The computing device 100 is, as described above, any personal computer, web server, Personal Digital Assistant (PDA), cellular phone, or other computing device that is able to connect to, and communicate with, the network 202. The network 202 can generally be described as the Internet or world wide web accessible by anyone with a properly equipped computing device 100 and an internet service provider or other access mode. The network 202 may also be a closed network open only to those who have access rights or privileges, such as a network within a company available only to company employees, among other forms of closed networks. The server 204 may be any computing device capable of operating a search engine 210 and communicating with a network 202. The theme databases 206 comprise one or more computing devices capable of storing, retrieving and communicating, among other functions, data related to rich media themes.

The rich media themes stored in the theme databases 206 and that are described subsequently herein, are collections, compilations, or other groupings of one or more media components. The components may include one or more click-through portions, interactive portions, widgets, control modules, advertisements, videos, patterns, and images, among other available media. As a rich media theme, the components are often selected and arranged together to provide an organized, aesthetically pleasing, interactive, visual environment to a user with a subject matter that coincides either directly or generally, with a search query. The rich media theme layout is typically optimized to minimize interference with the search results and to adapt flexibly to the structure and layout of the results themselves.

With continued reference to FIG. 2, theme contributors 208, comprise any computing devices of individuals, groups, companies, or other organizations, that create, distribute, sell, or otherwise make available to the network 202 rich media theme content.

In practice the network 202 allows communication between the computing device 100, the server 204, the theme databases 206 and the theme contributors 208. Thus, a user of the computing device 100 may access or communicate with the server 204 and thereby, the search engine 210. In addition, the search engine 210 may communicate with the theme databases 206 and theme contributors 208. Further, the theme contributors 208 may access the theme databases 206 to store their rich media theme contributions therein or the theme contributors may store and provide access to their contributions on their own computing devices wherein, those devices are configured to function as servers for said contributions.

With continued reference to FIG. 2, the server 204 houses a search engine 210 which is comprised of a search query module 212 and a theme configuration module 214. The theme configuration module 214 is further comprised of an analyzing component 216, a database access component 218, a comparison component 220, a selection component 222, and a display component 224. The search engine 210 may be any search engine that can operate the theme configuration module 214. The search query module 212 comprises the standard functions of the search engine 210 including receiving a search query from a user, searching or crawling the internet, world wide web or an intranet, returning a listing of search results, and formatting the search results for display to a user, among others.

The theme configuration module 214 is comprised of components which provide the functions necessary to apply a rich media theme to a search results webpage (to be described below). Although the theme configuration module 214 is depicted here as a module in a search engine 210 on a server 204, it may alternatively be comprised of a browser plug-in, a toolbar add-on, or a native application, among others, and may reside on the computing device 100. The analyzing component 216 analyzes a search query received by the search query module 212 and the database access component 218 accesses the theme databases 206 via the network 202. The database access component 218 may also access rich media theme contributions stored by the contributors 208.

The comparison component 220 provides a comparison of the results of the analysis completed by the analysis component 216 and the available rich media themes found by the database access component 218. The selection component 222 utilizes the results of the comparison component 220 to aid in selecting a rich media theme. The display component 224 receives the selected rich media theme and the search results from the search query module 212 and composes a search results webpage. The display component 224 also communicates the search results webpage to the computing device 100 for display to a user.

Figure 3:
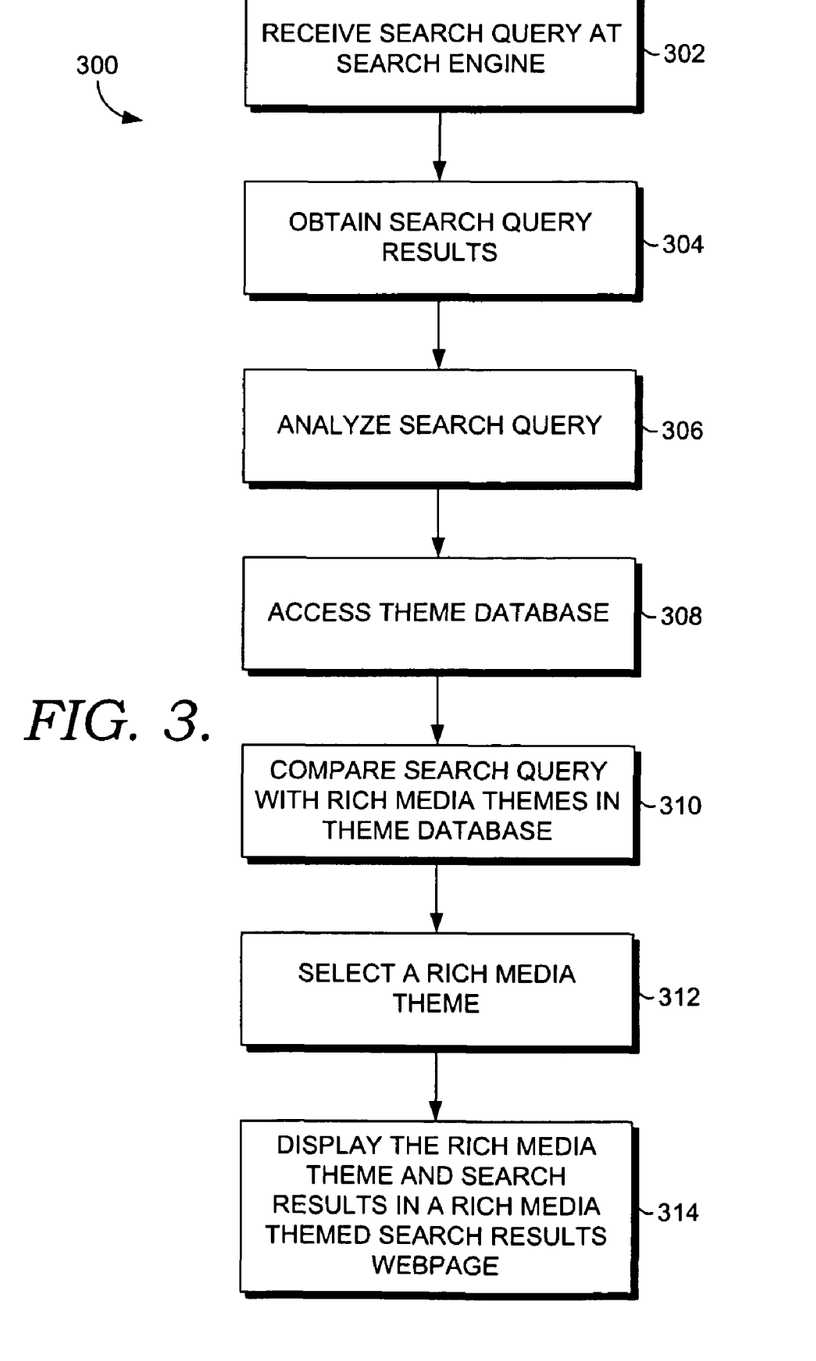
FIG. 3 is a flow diagram illustrating a method for displaying a rich media theme and search query results according to an embodiment of the present invention.

Turning now to FIG. 3, a method for displaying a rich media theme and search query results 300 according to an embodiment of the present invention is described. Initially, a user enters a search query at a computing device 100 which is received by a search engine 210 at step 302. The search query may contain one or more words and operators (e.g. functional characters that instruct the search engine's 210 searching technique) and may also be accompanied by one or more user context data that are collected, submitted or otherwise gathered at the computing device 100 or other sources on the network 202. The user context data may include a user's location, language settings, product market, time of day, computing device 100 capabilities and settings, network bandwidth estimates, browser types, identity, demographic data such as age, race or gender, previous interactions and preferences, or membership in a group or cluster of people defined via statistical analysis, among many other possible characteristics. The user data may be collected with or without the user's knowledge, may be input by the user, such as by inputting user preferences, may be obtained through tracking a user's browsing habits and history or by data mining, among others.

The search query words and operators are utilized by the search query module 212 of the search engine 210 to obtain search query results at step 304. The search query words, operators and user context data are then analyzed at step 306 by the analyzing component 216 of the theme configuration module 214. The analyzing component 216 may examine the search query words, associated user context data, network context data, advertising policies, or any combination of these to determine key words, phrases or user characteristics that suggest a particular theme or subject matter. At step 308 the database access component 218 accesses the theme databases 206 to allow the comparison component 220 to compare the search query analysis to rich media themes that are available in the theme databases in step 310. From the available rich media themes, one is selected at step 312, that correlates with the suggested particular theme or subject matter found by the analyzing component 216 in step 306.

The correlation may be a direct relationship between the search query and the rich media theme or may be a more general connection based on subject matter. For example, a search query for a particular rock music band, including the name of the band may be correlated directly to a rich media theme depicting the band or more generally to a rich media theme depicting rock music. Further, the level of correlation required for selecting a particular rich media theme may be determined by an administrator of the theme configuration module 214 or search engine 210.

Additionally, as with search results listings, advertisers may be allowed to be theme contributors 208 and pay for an increased level or number of correlations to given search queries. The selection can also be impacted by other factors, such as current events, network characteristics, time of day, the user's context information, and advertising agreements, among others. The various selection inputs may be analyzed in a multitude of ways to make the final selection. Further, a network policy, such as an affiliation with a company or network service provider, may be utilized to affect the choice of the rich media theme to display, such that the content selection is altered by such a policy, or the content itself is modified as in a co-branding situation.

Continuing in FIG. 3, the selected rich media theme from step 312 and the search query results from step 304 are communicated to the display component 224. They are then displayed as a rich media themed search results webpage on computing device 100 at step 314.

Figure 4:
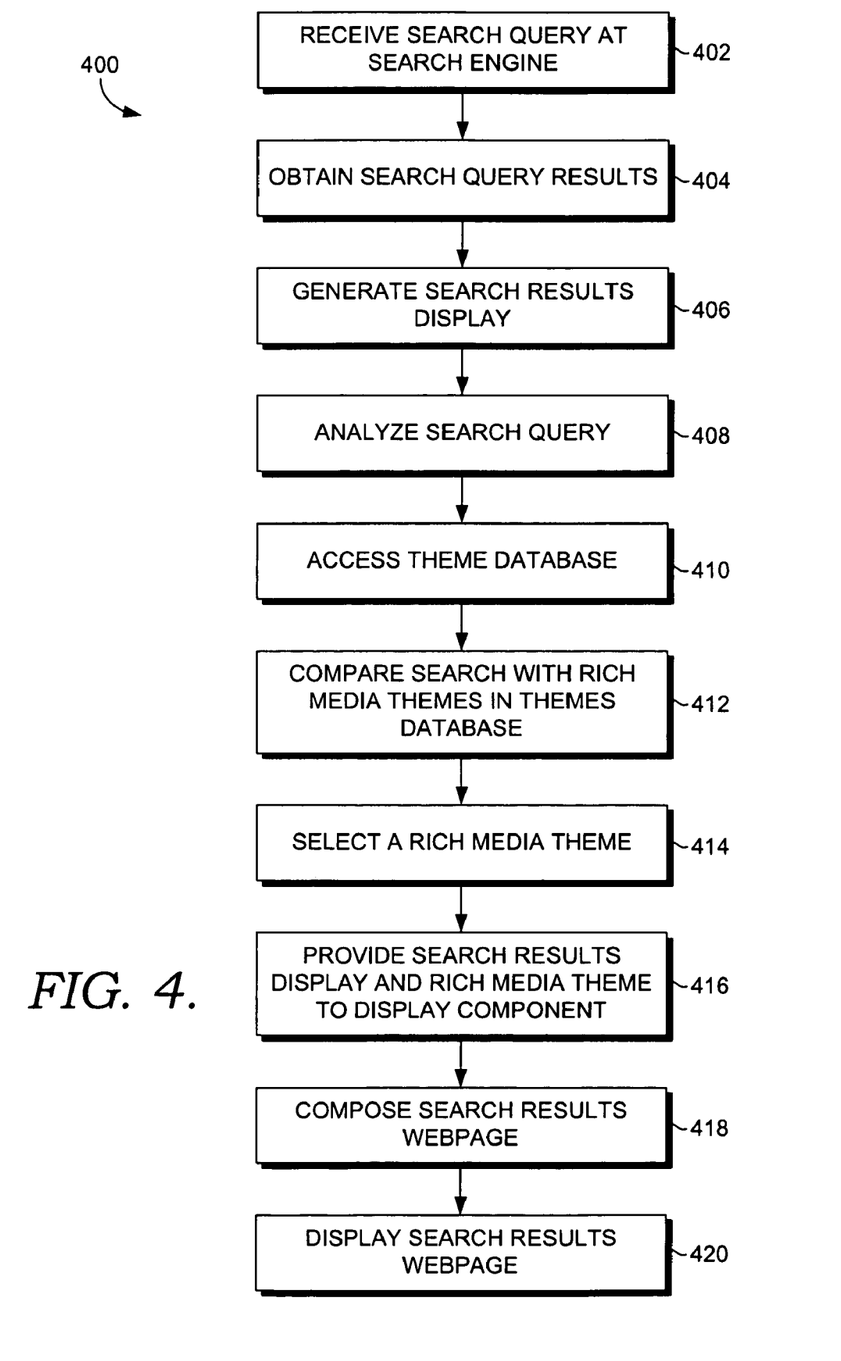
FIG. 4 is a flow diagram illustrating a method for displaying a rich media theme and search query results according to an embodiment of the present invention.

With respect to FIG. 4, a method for displaying a rich media theme and search query results according to another embodiment of the present invention is described. A search query is entered by a user at a computing device 100 and is received by the search engine 210 at step 402. Search query results are obtained by the search query module 212 at step 404 and a search results display is generated at step 406. The search results display is typically generated in a known or common format, such as that described previously wherein the search results are listed in a left justified column. The search query is next, analyzed at step 408 by the analyzing component 216 of the theme configuration module 214. The theme databases 206 are accessed at block 410 and the search query analysis is compared with the available rich media themes at step 412. A rich media theme is selected by the selection component 222 at block 414 and the rich media theme and search results display are provided to the display component 224 at step 416. The display component 224 then composes a search results webpage at block 418 which is then displayed at computing device 100 at step 420.

Figure 5:
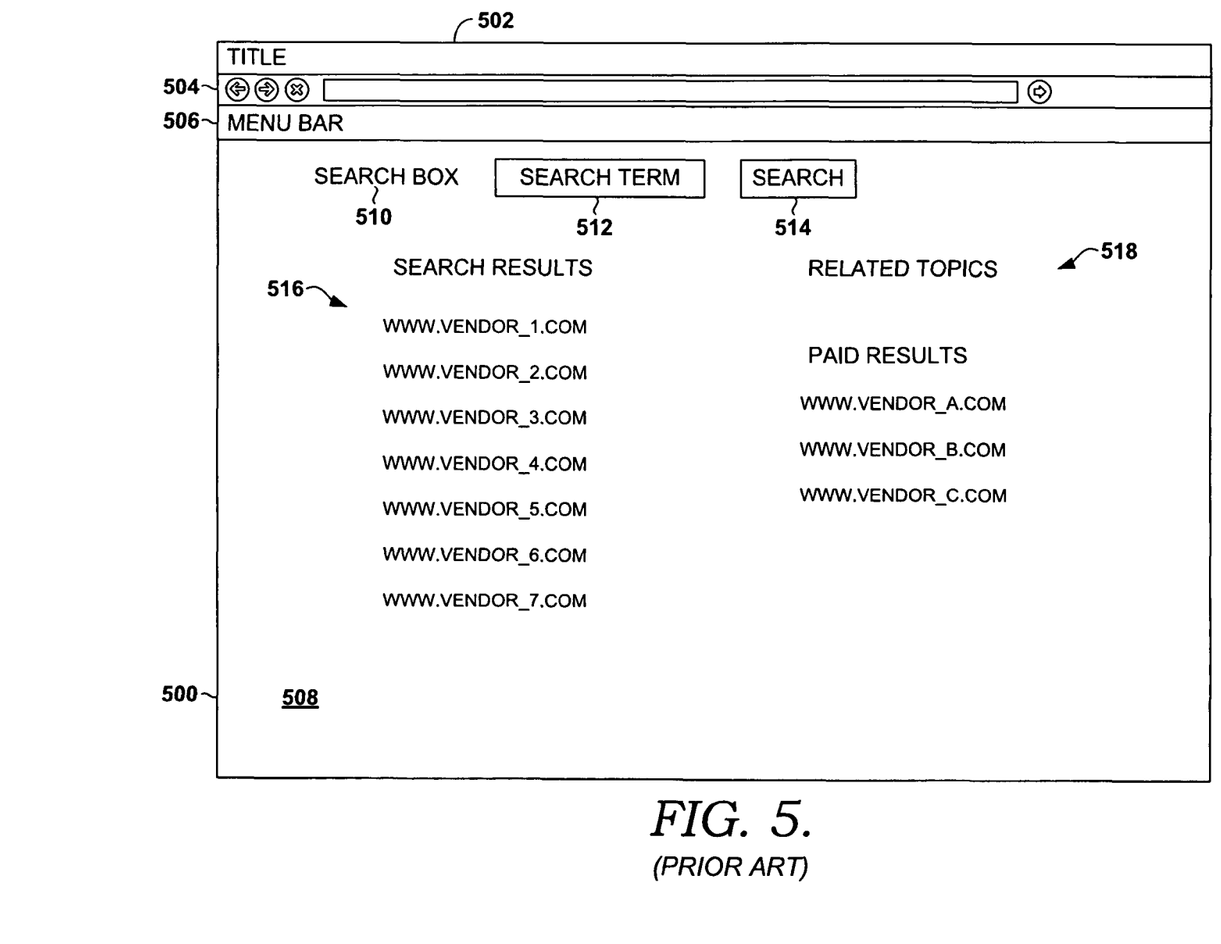
FIG. 5 is an illustration of a web browser window displaying a search results webpage as is known in the prior art.

A typical web browser window 500 depicting a common layout of a search results webpage 508 in the prior art is depicted in FIG. 5. A web browser window 500 in the prior art commonly includes, a title bar 502 that indicates the title of a website, a navigation bar 504 in which navigation buttons and web address fields are located, and a menu bar 506 from which a user can access various menus. A conventional search results webpage 508 generally displays a search engine title 510, a search query field 512, and a search activation button 514 located near the top of the page. As described above, and now depicted in FIG. 5, a typical search results webpage 508 includes a search results listing 516 located near the left side of the page, leaving room for a left margin, and is left justified. A secondary search results listing 518 may also be located along the right side of the search results listing 516 to provide additional search results links. However, it will be appreciated that the search results webpage depicted is exemplary and that the search results webpage may be in a variety of formats.

Figure 6:
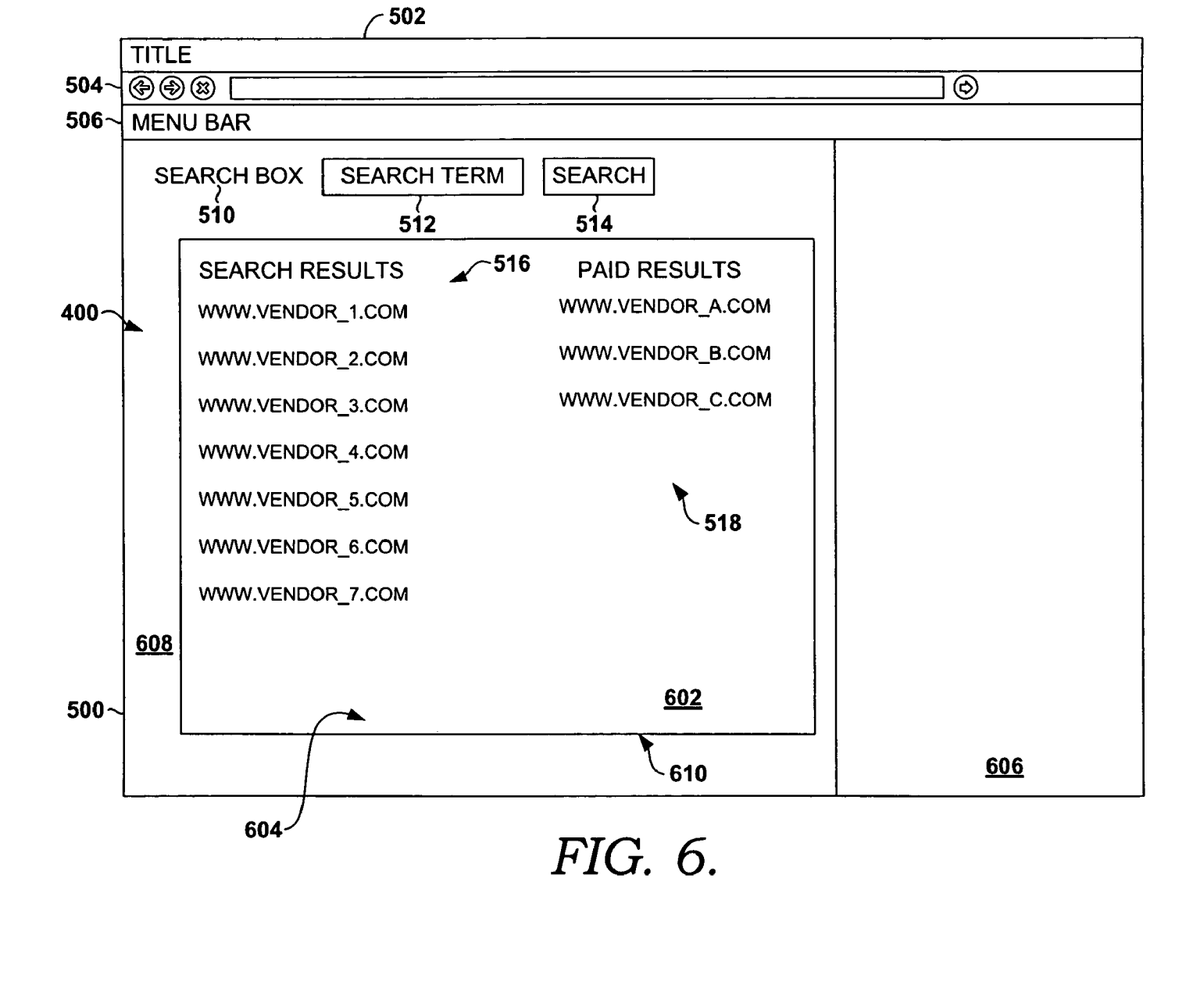
FIG. 6 is an illustration depicting areas of a search results webpage in which a rich media theme may be applied in an embodiment of the present invention.

In FIG. 6, an exemplary search results webpage 600 is depicted in a web browser window 500 to describe possible locations or portions of the search results webpage in which a rich media theme may be applied according to an embodiment of the present invention. The web browser window 500 includes all of the features described above and commonly found in the art. The search results webpage 600 also includes the components of a standard search results webpage 508 but with additional features. The additional features include a search results presentation area 602, a background area 604, a right margin 606 a left margin 608, a top margin 610 and a bottom margin 612.

For the description of the aforementioned elements, it is advantageous to visualize the search results webpage 600 as a layered object having a depth in the z direction, going into the page. Therefore objects or elements said to be on top, or in front of others are commonly said to be higher in the z-order while those behind are lower in z-order. Objects with a lower z-order can still be visible if they are not blocked by layers in front. Layers can employ a transparency color, a alpha channel for opacity settings per pixel, or a model driven approach to control areas where layers behind them are revealed. Elements on the search results webpage 600, such as the search engine title 510, search query field 512, search activation button 514, the search results listing 516, and secondary search results listing 518 are typically retained at the highest z-order to so as to maintain visibility of those elements.

The search results presentation area 602 encompasses an area around and behind the search results listing 516 and the secondary search results listing 518. The search results presentation area 602 may have any shape or outline capable of enclosing the search results listing 516. Further, the search results presentation area 602 may be broken into more than one area where such a configuration might be advantageous. When a rich media theme is applied to the search results webpage 600 the search results presentation area 602 is typically provided with a color, shading, texture, pattern or other effect that is greatly muted, softened or otherwise devised to maintain a strong contrast and good visibility of the search results listings 516. In addition, the borders 614 of the search results presentation area 602 are often given a transition effect such as a color gradient, smudging, or fading, among others. The background area 604 includes the entire area of the search results webpage 600 behind all other elements therein and may be given a color, pattern or other effect to provide a backdrop for the other components of a rich media themed search results webpage 600. The right margin 606 comprises the area to the right of the search results presentation area 602 and is the typical location of the majority of rich media theme components.

The rich media theme components may include one or more click-through portions, interactive portions, widgets, control modules, advertisements, videos, patterns, and images, among other available media. The size of the right margin 606 is variable and is dependent on a user's screen width and settings, the size of a user's web browser window 500 and the width of a search results listing 516 provided by a given search engine, among others. The left margin 608, top margin 610 and bottom margin 612 comprises the areas between the left, top and bottom sides of the search results webpage 600 and the left, top, and bottom sides of the search results presentation area 602 respectively. These margin areas may contain elements or components of a rich media theme such as a click-through portion, an interactive portion, a widget, a control module, an advertisement, a video portion, a pattern, or an image, or they may be left empty or transparent to allow the background area 604 to show through. As with the border 610 of the search results presentation area 602, the junctures between each of the margin areas may be overlapped, smoothed or have another effect provided to create a desired visual transition.

Figure 7:
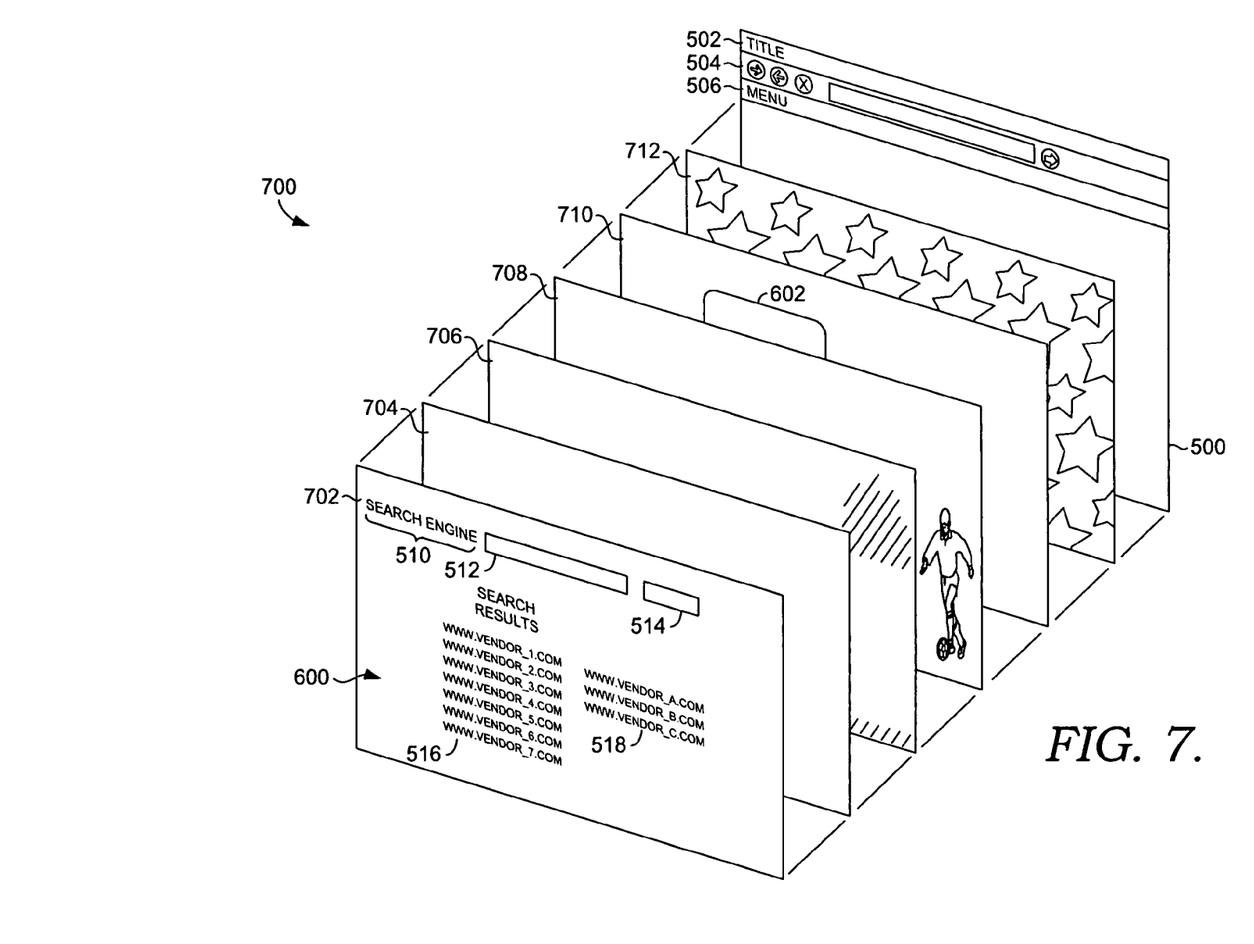
FIG. 7 is a three-dimensional representation depicting a plurality of layers that are stacked to produce a rich media themed search results page in an embodiment of the present invention.

Moving now to FIG. 7, a three-dimensional view of a search results webpage 700 is shown exploded in the z direction according to another embodiment of the present invention. As shown in FIG. 7, the search results webpage 700 is comprised of a plurality of layers containing the various components that make up the rich media theme and search results display. These layers include a search results layer 702, a softening layer 704, a transitions layer 706, a media layer 708, a text visibility layer 710 and a theme background layer 712. Although, these several layers are discussed herein, one skilled in the art would find many alternative embodiments having different layers, components, or arrangements of layers, all of which cannot be described here. Those alternative embodiments are to be included under this description.

The search results layer 702 contains the search results listings 516 as well other components described above and is placed at the top of the z-order to provide good visibility to a user. A semi-transparent softening layer 704 is placed behind the search results layer 702 to produce a muted appearance to all of the subsequent layers. This further enhances the visibility of the search results and gives a muted or ambient appearance to the lower z-order rich media theme components. Another possible technique for creating a muted or ambient appearance may include the use of a transparent color or an alpha channel for expressing different opacity settings per pixel.

In addition to, or instead of a using a softening layer 704 the appearance of the rich media theme components may be softened, dulled or weakened in areas behind a search results listing 516 such that the search results retain prominence in a user's view An ambient presence is typically preferred for rich media theme elements in order to provide the theme in an unobtrusive way. This is desirable because the intent of the rich media theme is commonly, to enhance the search results webpage 700 and not to detract from its usefulness, clarity or appeal to a user.

A transitions layer 706 and a media layer 708 follow the softening layer 704. The transitions layer 706 provides visual transitions for media components found in the media layer 708. For example, a visual transition might be applied to provide a circular window through which a rectangular video image is viewed. When the circular window is applied in front of and overlapping the rectangular image all that is visible to a user is the circular portion of the video image that shows through the circular window. The media layer 708 contains the media components of the rich media theme which may include a click-through portion, an interactive portion, a widget, a control module, an advertisement, a video portion, a pattern, and an image, among many others. These components may be placed in various locations on the media layer 708 but, typically the majority of components are placed in the right margin 606 with fewer being located in the left 608, top 610 or bottom 612 margins. Further, media layer 708 may be more than one layer to allow media components to be placed on different layers. It is noted, that when the layers are stacked to compose the rich media themed search results webpage 700 a user is able to interact with the media components through higher z-order layers.

Following the media layer 708, a text visibility layer 710 typically contains a solid colored portion that corresponds to the size and shape of the search results presentation area 602. This provides a solid background behind the search results listing 518 text to again maintain visibility of the search results listing. A background layer 712 follows the text visibility layer 710 and provides a background color, texture, pattern, image or other visual representation for the rich media themed search results webpage 700. The web browser window 500 lies at the bottom of the z-order and forms the base upon which the layers are stacked to form a unified view of the rich media themed search results webpage 700.

Figure 8:
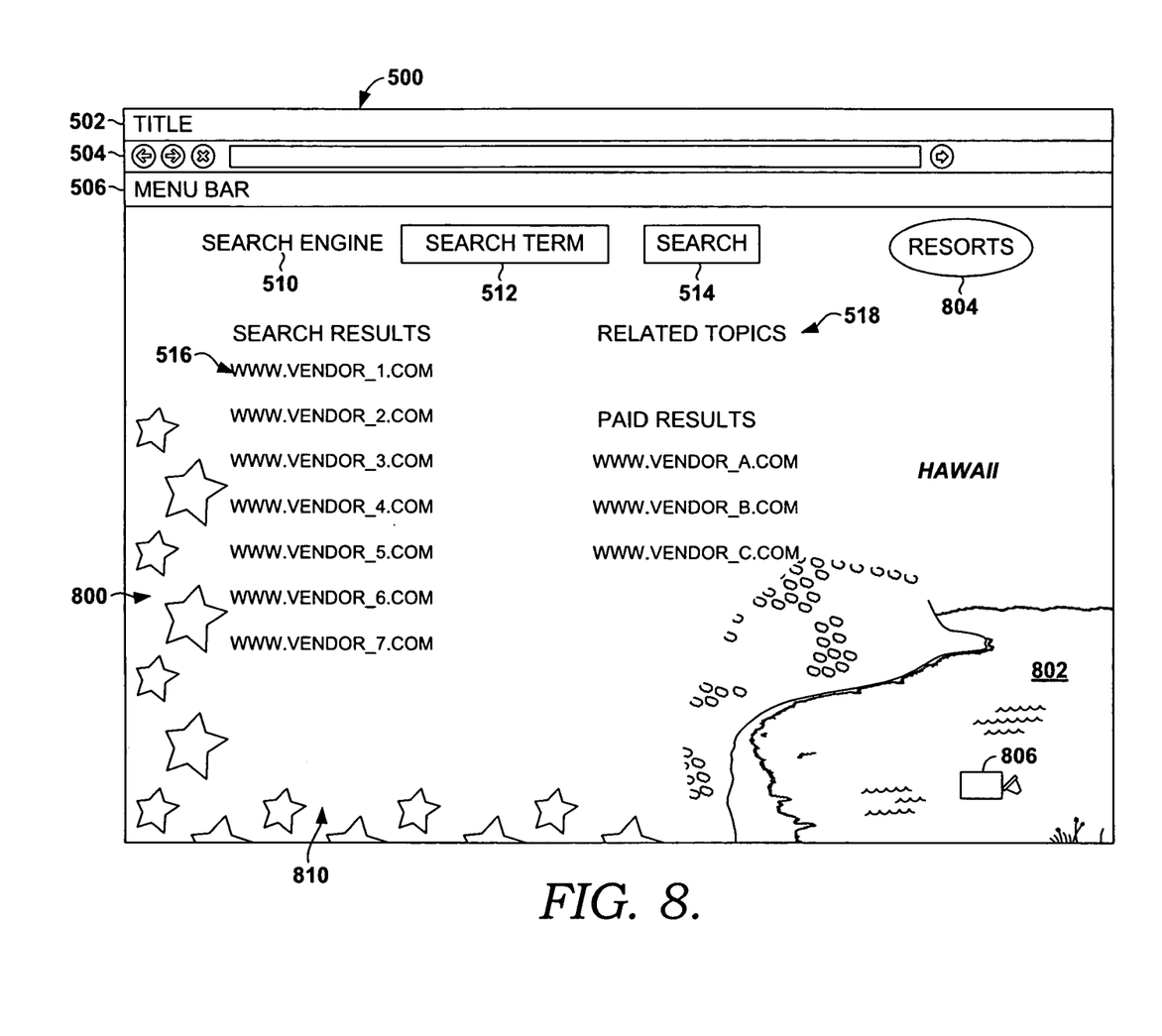
FIG. 8 is an illustration depicting a rich media themed search results page in another embodiment of the present invention.

A rich media themed search results webpage 800 produced from stacking layers to form a unified view is depicted in FIG. 8 according to another embodiment of the present invention. By stacking the layers the resulting search results webpage 800 appears to a user to be a single unified entity with multiple features provided thereon. The search results webpage 800 depicts a typical rich media theme layout and some possible components that may be included. A theme image 802, a click-through point 804, an interaction point 806 and a pattern 808 are shown. The theme image 802 can be any image, multiple images, words, drawings, or even any video, whether it be recorded, downloaded, streaming, or otherwise, that is included in a given theme. The theme image 802 also generally correlates with a search query such that the image is pertinent and relevant to the search query.

The click-through point 804 typically visually comprises an image, words, an advertisement, a symbol or other visual feature which designates an area that a user may select or click by using any available I/O components 120 available in the art, such as a mouse or keyboard. When a user selects the click-through point 804 a new web browser window, web browser tab or other program window is opened and directed to another webpage or program associated with the click-through point. In addition to a click-through point 804 the search results page 800 also includes an interaction point 806. An interaction point 806 is any figure or element on the search results webpage 800 that a user can select, click or otherwise interact with. For example, the interaction point 806, when clicked, will open a live web-cam of the location portrayed by the theme image 802. In other embodiments, the interaction point 806 can comprise a multiplicity of options such as a portion of the search results webpage where a user can play a game such as tic-tac-toe or checkers, a volume control for an audio file played in association with the rich media theme, a display control panel, a theme selection control panel where a user can select various rich media themes to be applied, a stock ticker, a television schedule, or an instant messenger window, among others. A pattern 808 is also depicted in FIG. 8. The pattern may comprise any color, pattern, texture or other visual effect an may occupy any region of the search results webpage.

With continued reference to FIG. 8 the rich media theme, as applied to the search results webpage 800, is preferably selected to be highly relevant to the search query and presented to a user in a high-quality, pleasing and unobtrusive manner. To achieve a highly relevant correlation between the rich media theme and the search query the exact query words or phrases may be matched, as well as different grammars of the search query, semantic concepts and relationships, user data, or user preferences, among others can be utilized. Additionally, to maintain high quality in the rich media theme when delivered to a user, user data such as computing device capabilities and settings, network bandwidth and connection type, among others may be considered and the rich media theme selected that best correlates with this data. Additionally, a portion of one or more rich media themes might also be downloaded to a user's computer prior to receiving a search query.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A computer-implemented method for providing on a display a rich media themed search results webpage, the method comprising the steps of:
   receiving a search query at a search engine;
   obtaining one or more search results from the search engine based on the search query;
   analyzing the search query received at the search engine;
   accessing one or more rich-media-theme databases storing rich-media themes that are interactive, visual backgrounds useable to enhance a display of the one or more search results;
   comparing the search query and the rich media themes stored in the one or more rich-media-theme databases;
   selecting a rich-media theme that correlates to the search query, wherein the selection of a rich-media theme is based on one or more user's device characteristics;
   providing a plurality of layers in which one or more components of the search results display are displayed in a top layer, and one or more components of the rich media theme are displayed in one or more background layers; and
   composing a search results webpage by stacking the layers to create a unified display in which at least a portion of each layer is visible through an overlying layer, the rich media theme being displayed in an ambient manner that does not obstruct a user's view of the search results display, and the rich media theme being representative of the subject matter of the search query and user's device characteristics.

2. The computer implemented method of claim 1, wherein the rich media theme is comprised of one or more layers having one or more rich media components.

3. The computer-implemented method of clam 1, wherein the user context data comprises one or more of a user's: current location, language, product market, computing device capabilities, network bandwidth, browser type, identity, demographic profile, previous interactions and preferences, or membership in a group.

4. The computer-implemented method of claim 1, wherein the rich media theme is an advertisement.

5. The computer implemented method of claim 1, wherein the rich media theme is selected based a direct correlation to at least one search term.

6. The computer-implemented method of claim 1, wherein the rich media theme is selected based on a general subject matter of the search query.

7. The computer-implemented method of claim 1, wherein at least a portion of the rich media theme is downloaded to a user's computer prior to receiving the search query.

8. The computer-implemented method of claim 1, wherein the step of displaying utilizes a plurality of layers of media content to compose the search results webpage, and wherein the search results are displayed in a top layer and the rich media theme is displayed in one or more background layers.

9. The computer-implemented method of claim 1, wherein a model search results layout is employed to determine a layout for the rich media theme.

10. The computer-implemented method of claim 2 wherein the rich media theme includes at least one of: a click-through portion, an interactive portion, a widget, a control module, an advertisement, a video portion, an audio portion, a pattern, and an image.

11. A computerized system that provides a rich media themed search results webpage, the system comprising:
one or more first computing devices having a processor and configured to execute a search engine that includes
a search query module that receives a search query from a user and that returns a search results display, and
a theme configuration module that analyzes the search query to identify a subject matter of the search query, returns a rich media theme that correlates with the subject matter and is based on a user's personal preferences, provides a plurality of layers in which one or more components of the search results display are displayed in a top layer, and one or more components of the rich media theme are displayed in one or more background layers, and composes a search results webpage by stacking the layers to create a unified display in which at least a portion of each layer is visible through an overlying layer, the rich media theme being displayed in an ambient manner that does not obstruct a user's view of the search results display, and the rich media theme being representative of the subject matter of the search query and user's personal preferences; and
a second computing device having a processor and configured to display the search results webpage.

12. The computerized system of claim 11, wherein the theme configuration module further comprises:
an analyzing component that analyzes at least one of search query terms and user context data associated with the query;
a database access component that accesses one or more databases in which one or more rich media themes are stored;
a comparison component that compares results from the analyzing component and the database access component;
a selection component that selects a rich media theme based on the comparison from the comparison component; and
a display component that composes the search results webpage from the selected rich media theme and the search results display.

13. The computerized system of claim 11, wherein the rich media theme includes at least one of: a click-through portion, an interactive portion, a widget, a control module, an advertisement, a video portion, an audio portion, a pattern, and an image.

14. The computerized system of claim 11, wherein the theme configuration module is comprised of one or more of: a website, a browser plug-in, a native application running on a device, and a toolbar add-on.

15. The computerized system of claim 11, wherein the rich media theme is an advertisement.

16. The computerized system of claim 12, wherein the user context data analyzed by the analyzer component includes one or more of a user's: current location, language settings, product market, computing device capabilities, network bandwidth, browser type, identity, demographic profile, previous interactions and preferences, or membership in a group.

17. The computerized system of claim 12, wherein a user's personal preferences are employed by the selection component to affect the choice of the rich media theme to display.

18. The computerized system of claim 12, wherein a user's personal preferences are employed by the display component to affect a layout of the rich media theme.

19. The computerized system of claim 12, wherein a network policy is employed by the selection component to affect the choice of the rich media theme to display.

20. A computer-implemented method for providing on a display a rich media themed search results webpage, the method comprising the steps of:
receiving a search query at a search engine;
obtaining one or more search results from the search engine;
generating a search results display;
analyzing one or more terms included in the search query to identify a subject matter associated with the search query;
accessing one or more rich-media-theme databases;
comparing the subject matter of the search query and one or more rich media themes stored in the one or more rich-media-theme databases;
selecting a rich media theme based on the subject matter, one or more user's personal preferences, user's device characteristics and a network policy, the rich media theme including a grouping of media components that enhance a visual environment of a search results webpage, and one or more user context data describing characteristics of one or more of a display device and communications with the display device;
providing a plurality of layers in which one or more components of the search results display are displayed in a top layer, and one or more components of the rich media theme are displayed in one or more background layers;
composing a search results webpage by stacking the layers to create a unified display in which at least a portion of each layer is visible through an overlying layer, the rich media theme being displayed in an ambient manner that does not obstruct a user's view of the search results display, and the rich media theme being representative of the subject matter of the search query, user's personal preferences, user's device characteristics and network policy; and
providing the search results webpage for presentation on the display device.

* * * * *